United States Patent
Hosotani et al.

(10) Patent No.: US 9,966,863 B2
(45) Date of Patent: *May 8, 2018

(54) SWITCHING POWER-SUPPLY CIRCUIT (71) Applicant: Murata Manufacturing Co., Ltd., Nagaokakyo-shi, Kyoto-fu (JP)

(72) Inventors: Tatsuya Hosotani, Nagaokakyo (JP); Satoshi Yamaguchi, Nagaokakyo (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 0 days. days.

This patent is subject to a terminal disclaimer.

(21) Appl. No.: 15/442,979

(22) Filed: Feb. 27, 2017

(65) Prior Publication Data
US 2017/0170737 A1    Jun. 15, 2017

Related U.S. Application Data (63) Continuation of application No. 13/900,711, filed on May 23, 2013, now Pat. No. 9,621,048, which is a (Continued)

(30) Foreign Application Priority Data
Dec. 2, 2010    (JP) .................. 2010-268884

(51) Int. Cl.
H02M 3/335 (2006.01)
H02M 1/08 (2006.01)
H02M 1/00 (2006.01)

(52) U.S. Cl.
CPC ......... H02M 3/33523 (2013.01); H02M 1/08 (2013.01); *H02M 2001/0054* (2013.01)

(58) Field of Classification Search
CPC ......... H02M 3/33553; H02M 3/33507; H02M 3/33576; H02M 3/33561
See application file for complete search history.

(56) References Cited

U.S. PATENT DOCUMENTS

| | | | | |
|---|---|---|---|---|
| 6,469,913 | B2 * | 10/2002 | Hosotani | H02M 3/3382 363/16 |
| 6,836,161 | B2 * | 12/2004 | Akiyama | H03K 17/0406 327/108 |
| 7,906,868 | B2 * | 3/2011 | Ferguson | H02M 3/3353 307/31 |
| 2001/0017780 | A1 * | 8/2001 | Hosotani | H02M 3/33561 363/16 |

(Continued)

OTHER PUBLICATIONS

Hosotani et al., "Switching Power-Supply Circuit", U.S. Appl. No. 13/900,711, filed May 23, 2013.

*Primary Examiner* — Timothy J Dole
*Assistant Examiner* — Sisay G Tiku
(74) *Attorney, Agent, or Firm* — Keating & Bennett, LLP (57) ABSTRACT

A switching power-supply circuit includes a second rectifying/smoothing circuit arranged to generate a second output voltage by rectifying and smoothing the output of a second secondary winding, and the second rectifying/smoothing circuit includes a second rectifier circuit and a capacitor, connected to the second secondary winding. A second switching control circuit operates in response to an alternating-current winding voltage occurring in the second secondary winding, and includes a time constant circuit causing a switch mechanism connected to the control terminal of a rectifier switch element to operate, and a second feedback circuit arranged to detect and feed back the second output voltage to the time constant circuit.

16 Claims, 4 Drawing Sheets

Related U.S. Application Data continuation of application No. PCT/JP2011/076480, filed on Nov. 17, 2011.

(56)  References Cited

U.S. PATENT DOCUMENTS

| | | | | |
|---|---|---|---|---|
| 2004/0227496 | A1* | 11/2004 | Hosotani | H02M 1/4208 323/282 |
| 2006/0158908 | A1* | 7/2006 | Usui | H02M 3/33561 363/15 |
| 2006/0176715 | A1* | 8/2006 | Hosotani | H02M 3/33569 363/21.01 |
| 2007/0008757 | A1* | 1/2007 | Usui | H02M 3/33507 363/125 |
| 2007/0025031 | A1* | 2/2007 | Kwon | H02M 3/33561 361/38 |
| 2007/0025123 | A1* | 2/2007 | Kim | H02M 1/08 363/16 |
| 2009/0251925 | A1* | 10/2009 | Usui | H02M 3/33561 363/16 |
| 2009/0316444 | A1* | 12/2009 | Yamaguchi | H02M 3/3353 363/21.12 |
| 2009/0322257 | A1* | 12/2009 | Kim | H02J 9/005 315/308 |
| 2012/0314454 | A1* | 12/2012 | Hosotani | H02M 3/33507 363/21.01 |
| 2013/0336016 | A1* | 12/2013 | Shiji | H02M 3/33507 363/21.02 |
| 2014/0146577 | A1* | 5/2014 | Uno | H02M 3/33561 363/21.02 |

* cited by examiner

SWITCHING POWER-SUPPLY CIRCUIT

BACKGROUND OF THE INVENTION

1. Field of the Invention

The present invention relates to a switching power-supply circuit that outputs a voltage from each of a plurality of output portions, and in particular, to a switching power-supply circuit including a circuit that stabilizes the output voltage of a second output portion, in addition to a feedback circuit that feedback-controls a primary side in accordance with the output voltage of a first output portion.

2. Description of the Related Art

In International Publication No. WO2006/061924 Japanese Unexamined Patent Application Publication No. 3-7062, and Japanese Unexamined Patent Application Publication No. 2000-217356, switching power-supply circuits are disclosed each of which outputs a voltage from each of a plurality of output portions. In any one of International Publication No. WO2006/061924 Japanese Unexamined Patent Application Publication No. 3-7062, and Japanese Unexamined Patent Application Publication No. 2000-217356, a configuration is provided in which a rectified voltage or a rectified and smoothed voltage is input to output a second output (sub output) voltage separately from the first output (main output) of a converter and the second output voltage is adjusted by controlling a switching element on a second output side in accordance with this second output voltage.

In a switching power-supply circuit disclosed in International Publication No. WO2006/061924, a time period when electric power is supplied from the primary side of a transformer to the secondary side thereof is defined based on a resonant frequency that is defined based on a capacitor used for current resonance and the leakage inductance of the transformer (See, for example, Paragraph [0034] in International Publication No. WO2006/061924). In addition, in a second output line, an output control switching element and an output control circuit controlling the pulse widths of the turn-on and turn-off thereof are provided (See, for example, Paragraph [0028] in International Publication No. WO2006/061924).

Figures 1A, 1B:
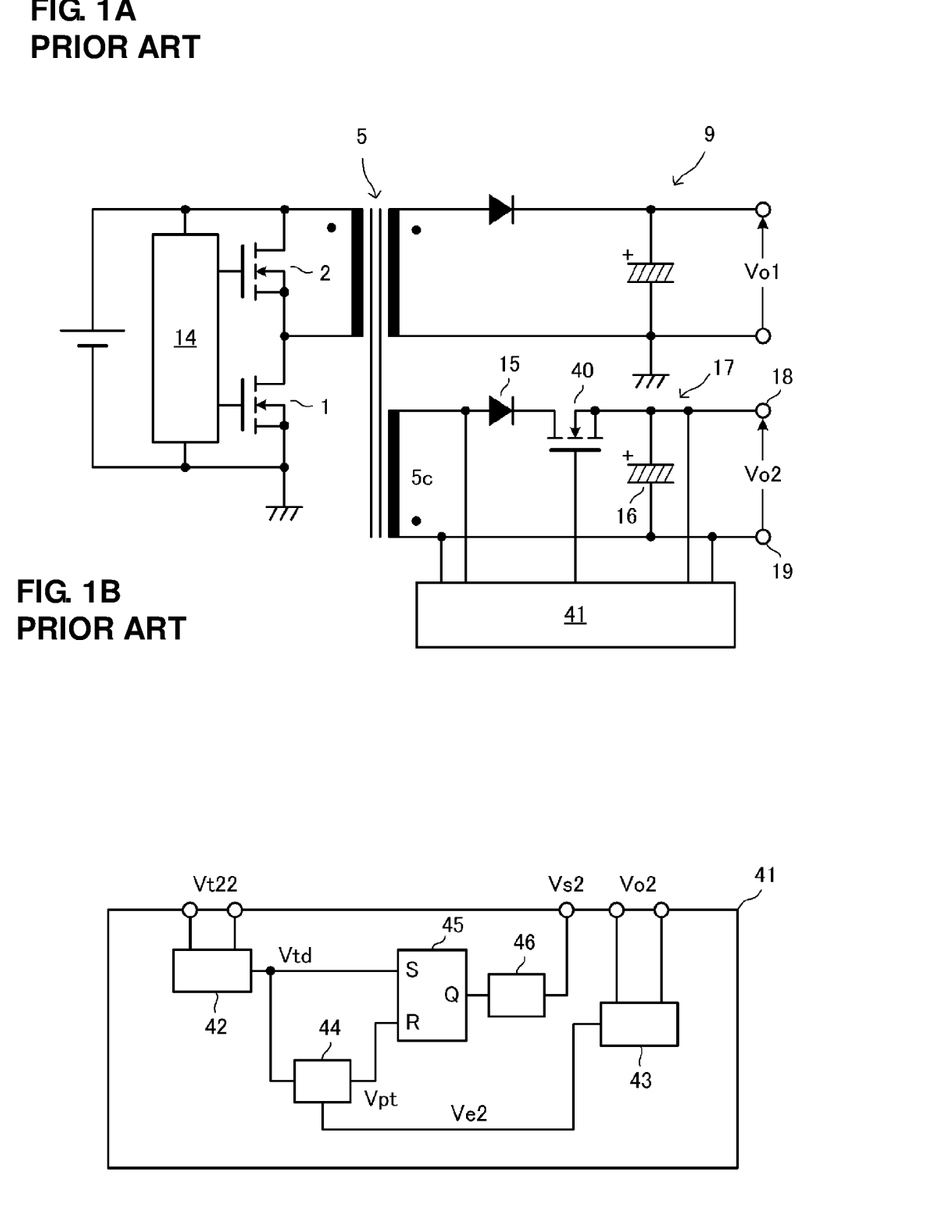
FIG. 1A is a schematic view of a switching power-supply circuit illustrated in International Publication No. WO2006/061924.
FIG. 1B is a block diagram of the inside of an output control circuit.

FIG. 1A is the schematic view of the switching power-supply circuit illustrated in International Publication No. WO2006/061924, and FIG. 1B is the block diagram of the inside of the output control circuit. In the switching power-supply circuit, an output control MOS-FET 40 is connected between the cathode of a second output rectifier diode 15 and a second output smoothing capacitor 16 which are included in a second rectifying/smoothing circuit 17, and between second direct-current output terminals 18, 19 and the gate of the output control MOS-FET 40, an output control circuit 41 is provided that controls the turn-on and turn-off of the output control MOS-FET 40 based on the voltage of the second output smoothing capacitor 16. The output control MOS-FET 40 is subjected to an on-off operation in synchronization with the on-period of a first main MOS-FET 1 and with a same switching frequency. In addition, a main control circuit 14 fixes the on-period of the first main MOS-FET 1, and controls the on-duty of the first main MOS-FET 1 by changing the on-period of a second main MOS-FET 2 based on the output voltage Vo1 of a first rectifying/smoothing circuit 9.

As illustrated in FIG. 1B, the output control circuit 41 includes a voltage fluctuation detection circuit 42 detecting a voltage Vt22 occurring in the second secondary winding 5c of a transformer 5 at the time of the turn-on of the first main MOS-FET 1, a second output voltage detection circuit 43 detecting the voltage Vo2 of the second output smoothing capacitor 16 and outputting an error signal Ve2 between the detected voltage and a reference voltage specifying a second output voltage value, a PWM control circuit 44 that is driven by the detection signal Vtd of the voltage fluctuation detection circuit 42 and outputs a pulse train signal Vpt having a duty ratio controlled based on the error signal Ve2 of the second output voltage detection circuit 43, an RS flip-flop 45 that is set by the detection signal Vtd of the voltage fluctuation detection circuit 42 and reset by the pulse train signal Vpt of the PWM control circuit 44, and a drive circuit 46 supplying an actuation signal Vs2 to the gate of the output control MOS-FET 40 due to the output signal of the RS flip-flop 45.

Due to this configuration, the output control MOS-FET is PWM-controlled in accordance with the second output voltage Vo2, and the second output voltage Vo2 is stabilized.

In a switching power-supply circuit disclosed in Japanese Unexamined Patent Application Publication No. 3-7062, a configuration is provided in which a first output voltage is controlled by a frequency modulator including a secondary-side control mechanism controlling the duty cycle of a pulse train and a second output voltage is controlled by thinning the number of pulse voltage waves.

In a switching power-supply circuit disclosed in Japanese Unexamined Patent Application Publication No. 2000-217356, a switch circuit is provided in the secondary winding output of a transformer in an output system other than an output system performing main feedback, furthermore an output voltage is detected, the ON-width of the secondary winding output of the transformer in the output system other than the output system performing the main feedback is controlled by causing a pulse width control circuit to generate a pulse signal and causing this pulse signal to be synchronized with the pulse control signal of the output system performing the main feedback, and the output voltage is stabilized.

In switching power-supply circuits disclosed in International Publication No. WO2006/061924, Japanese Unexamined Patent Application Publication No. 3-7062, and Japanese Unexamined Patent Application Publication No. 2000-217356, the following problems have occurred.

When a switching control circuit on a secondary side is configured using a logic circuit, a direct-current power-supply voltage arranged to cause the logic circuit to operate is required, a synchronizing circuit arranged to operate in synchronization with the switching frequency of a main switching element in a converter is required, and a PWM control circuit outputting a pulse train signal having a duty ratio is required.

As a result of these required circuits, a power-supply device is complicated and it is difficult to reduce the size and/or weight thereof.

SUMMARY OF THE INVENTION

Preferred embodiments of the present invention provide a switching power-supply circuit in which a switch control circuit on a secondary side is simplified and reduced in size and cost while a high degree of accuracy in the output voltage of a second output portion is maintained.

A switching power-supply circuit according to a preferred embodiment of the present invention includes a transformer including a primary winding, a first secondary winding, and a second secondary winding, a main switching element arranged to be connected in series to the primary winding, a first rectifying/smoothing circuit arranged to generate a first output voltage by rectifying and smoothing an output of the first secondary winding, a second rectifying/smoothing circuit arranged to generate a second output voltage by rectifying and smoothing an output of the second secondary winding, a first feedback circuit arranged to generate a feedback signal according to the first output voltage, and a first switching control circuit arranged to control the main switching element based on the feedback signal and stabilize the first output voltage. The second rectifying/smoothing circuit includes a second rectifier circuit, the second rectifier circuit includes a rectifier switch element, and a second switching control circuit arranged to control the rectifier switch element, and the second switching control circuit operates in response to an alternating-current winding voltage occurring in the second secondary winding provided in the transformer or a drive winding provided in the transformer, and includes a time constant circuit arranged to cause a switch mechanism connected to a control terminal of the rectifier switch element to operate, and a second feedback circuit arranged to detect and feed back the second output voltage to the time constant circuit.

With this configuration, since the second switching control circuit drives and controls the rectifier switch element using the alternating-current winding voltage occurring in the secondary winding provided in the transformer or the drive winding provided in the transformer, a direct-current power-supply voltage that is used to cause the second switching control circuit to operate is not required.

In addition, a synchronizing circuit that is used to operate in synchronization with the switching frequency of the main switching element is not required.

The time constant circuit that operates in response to the alternating-current winding voltage is provided, and thus, a PWM control logic circuit that outputs a pulse train signal is not required.

Due to the control of the rectifier switch element, the second output voltage becomes a highly accurate voltage, and it is possible to control a plurality of output voltages with a high degree of accuracy.

The rectifier switch element is caused to operate in synchronization with a switching frequency. Therefore, there is no interference due to the mixing of a plurality of switching frequencies, and it is possible to significantly reduce or prevent the occurrence of sound or noise.

In the switching power-supply circuit according to another preferred embodiment of the present invention, a winding that generates the alternating-current winding voltage is preferably the second secondary winding, and the switching power-supply circuit preferably further includes a boot capacitor arranged to be charged by a supply of electric charge from the second output voltage during a time period when the alternating-current winding voltage becomes a negative voltage and discharged during a time period when the alternating-current winding voltage becomes a positive voltage. With this configuration, it is not necessary to provide an extra drive winding in the transformer, and it is possible to reduce the size and weight of the transformer.

In the switching power-supply circuit according to another preferred embodiment of the present invention, the second switching control circuit preferably includes a boot diode arranged to rectify the second output voltage and to supply electric charge to the boot capacitor. With this configuration, electric charge is supplied through the boot diode and the capacitor is charged. Accordingly, it is possible to reduce the impedance of a charging path and to increase a charging speed.

In the switching power-supply circuit according to another preferred embodiment of the present invention, in a path leading from the boot capacitor to the control terminal of the rectifier switch element, the second switching control circuit preferably includes a turn-on delay circuit arranged to define a discharging time constant for electric charge in the boot capacitor and to delay turn-on of the rectifier switch element, and the turn-on delay circuit is defined by a series circuit including a capacitor and a resistor.

With this configuration, by setting a delay amount with the turn-on delay circuit, it is possible to turn on the rectifier switch element with optimum timing and to reduce a switching loss caused by a ZCS (zero-current switch) operation.

In the switching power-supply circuit according to another preferred embodiment of the present invention, the second switching control circuit preferably includes a capacitor arranged to supply a current used to hold a conduction state of the switch mechanism, and a diode to rectify and supply electric charge from the boot capacitor to the capacitor.

With this configuration, electric charge is supplied through the diode and the capacitor is charged. Accordingly, it is possible to reduce the impedance of a charging path and to increase a charging speed.

In the switching power-supply circuit according to another preferred embodiment of the present invention, a winding arranged to generate the alternating-current winding voltage is preferably the drive winding provided in the transformer. With this configuration, a direct-current power-supply voltage that is used to cause the second switching control circuit to operate is not required.

In the switching power-supply circuit according to another preferred embodiment of the present invention, the second switching control circuit preferably includes a capacitor arranged to supply a current used to hold a conduction state of the switch mechanism, and a diode arranged to rectify and supply electric charge from the drive winding to the capacitor.

With this configuration, electric charge is supplied through the diode and the capacitor is charged. Accordingly, it is possible to reduce the impedance of a charging path and to increase a charging speed.

In the switching power-supply circuit according to another preferred embodiment of the present invention, the second switching control circuit preferably performs control of turning off the rectifier switch element within a time period of a positive voltage of the alternating-current winding voltage in a (light load) state in which a current of a load to which the second output voltage is applied is smaller than a predetermined value and turning on the rectifier switch element or maintaining an off-state during the time period of the positive voltage of the alternating-current winding voltage in a (heavy load) state in which the current of the load exceeds the predetermined value.

With this configuration, in a light load, the conduction time-period of the rectifier switch element is controlled and the voltage rise of the output voltage is significantly reduced or prevented. In addition to this, in a heavy load, the turn-off of the rectifier switch element is performed with a zero current (i.e., with a ZCS operation). Therefore, the occurrence of a switching loss is significantly reduced or prevented.

According to various preferred embodiments of the present invention, it is possible to provide a small-sized and low-cost switching power-supply circuit whose circuit configuration is simplified while maintaining a high degree of accuracy in the output voltage of a second output portion.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

First Preferred Embodiment

Figure 2A:
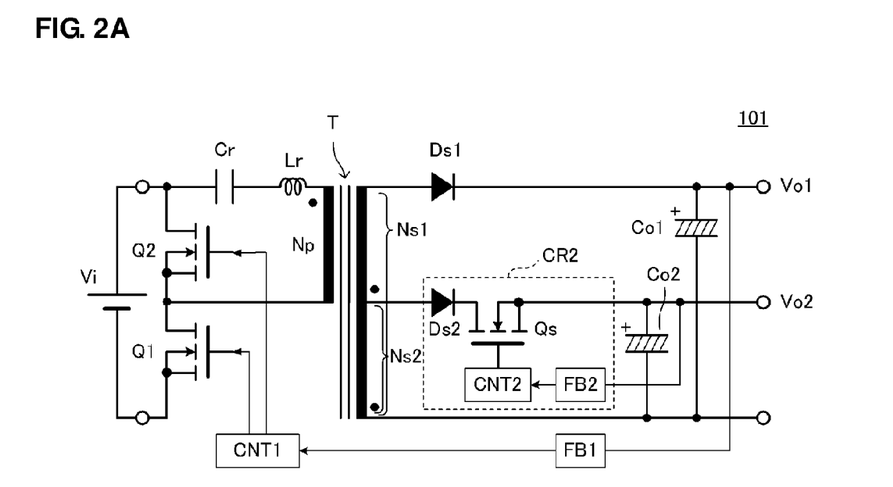
FIGS. 2A and 2B are circuit diagrams of a switching power-supply circuit according to a first preferred embodiment of the present invention.
Figure 2B:
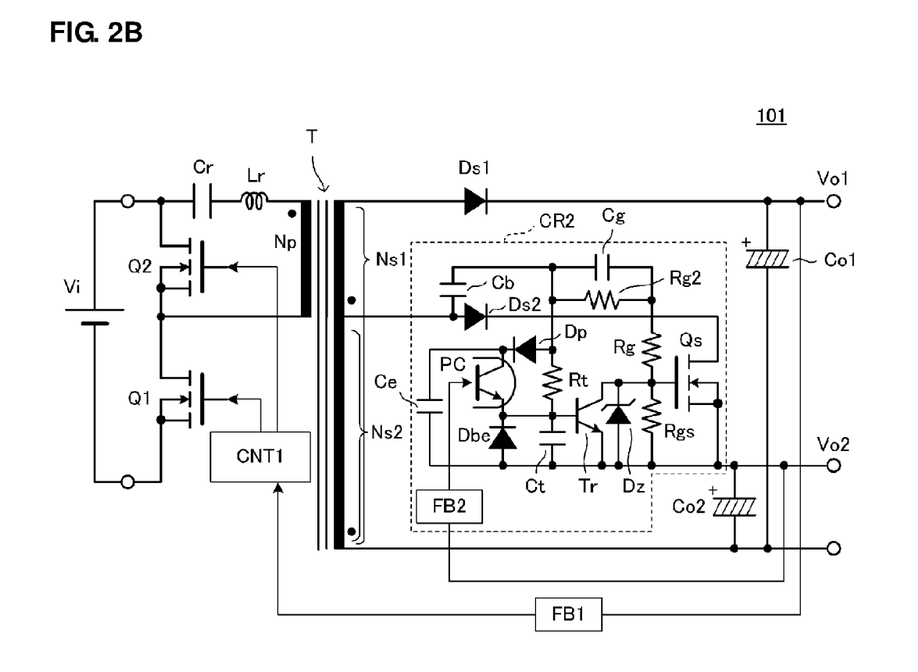
Figure 3:
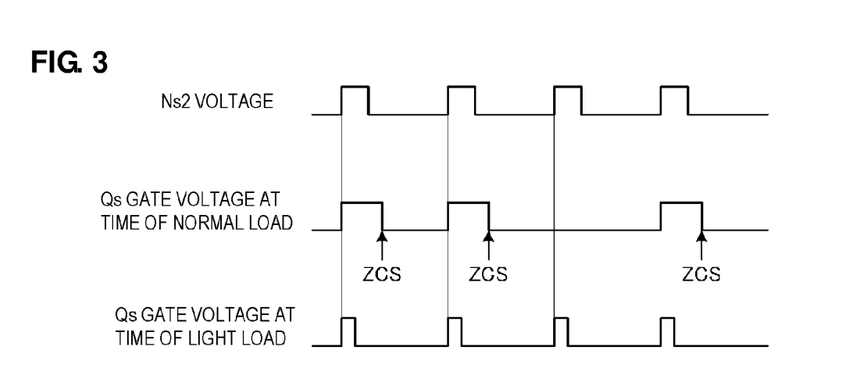
FIG. 3 is a main waveform diagram illustrating an operation of the switching power-supply circuit.

FIGS. 2A and 2B are the circuit diagrams of a switching power-supply circuit 101 according to a first preferred embodiment of the present invention. FIG. 3 is a main waveform diagram illustrating the operation of the switching power-supply circuit 101.

The switching power-supply circuit 101 includes a transformer T including a primary winding Np, a first secondary winding Ns1, and a second secondary winding Ns2, a first switching element (a main switching element) Q1 connected in series to the primary winding Np, a second switching element Q2 connected to a position providing a closed loop in combination with the primary winding Np, a first switching control circuit CNT1 alternately turning on and turning off the first switching element Q1 and the second switching element Q2 with a short dead time provided therebetween, and a first feedback circuit FB1. On the primary side of the transformer T, a resonance inductor Lr and a resonance capacitor Cr are provided in series with the primary winding Np. The resonance inductor Lr and the resonance capacitor Cr define a resonant circuit.

In addition, the switching power-supply circuit 101 includes a first rectifying/smoothing circuit arranged to generate a first output voltage Vo1 by rectifying and smoothing the output of the first secondary winding Ns1 and a second rectifying/smoothing circuit arranged to generate a second output voltage Vo2 by rectifying and smoothing the output of the second secondary winding Ns2. The first rectifying/smoothing circuit includes a diode Ds1 and a capacitor Co1 that are connected to the first secondary winding Ns1. In addition, the second rectifying/smoothing circuit includes a second rectifier circuit CR2 and a capacitor Co2 that are connected to the second secondary winding Ns2. The second rectifier circuit CR2 includes a rectifier switch element Qs, a second switching control circuit CNT2 arranged to control the rectifier switch element Qs, and a feedback circuit FB2. In addition, the second rectifier circuit CR2 includes a diode Ds2, which is connected in series to the rectifier switch element Qs and causes the voltage of the second secondary winding Ns2 to flow in a forward direction.

The function of the switching power-supply circuit 101 illustrated in FIG. 2A is as follows.

The first switching element Q1 and the second switching element Q2 are alternately turned on and turned off with a short dead time provided therebetween, in response to the control of the first switching control circuit CNT1. A switching frequency at this time is equal to or substantially equal to a resonant frequency due to the resonance inductor Lr and the resonance capacitor Cr.

When the first switching element Q1 has been turned off, a voltage having a reverse polarity occurs in the first secondary winding Ns1, the diode Ds1 is turned on, and the first output voltage Vo1 is supplied and is smoothed by the capacitor Co1.

The first feedback circuit FB1 negatively feeds back, to the first switching control circuit CNT1, a signal generated by comparing the first output voltage Vo1 with a reference voltage. As a result of this control, the first output voltage Vo1 is maintained at a predetermined voltage, regardless of a load current flowing in a load to which the first output voltage Vo1 is applied or the voltage fluctuation of an input power supply Vi.

On the other hand, when the first switching element Q1 has been turned off, a voltage having a reverse polarity also occurs in the second secondary winding Ns2. This voltage is rectified by the second rectifier circuit CR2 and smoothed by the capacitor Co2, and the second output voltage Vo2 is supplied. In this manner, during the off-period of the first switching element Q1, a pulse current flows in the rectifier switch element Qs.

The second feedback circuit FB2 negatively feeds back, to the second switching control circuit CNT2, a signal generated by comparing the second output voltage Vo2 with a reference voltage. Operations of the second feedback circuit FB2 and the second switching control circuit CNT2 are as follows.

When the output voltage Vo2 is less than the reference voltage, the rectifier switch element Qs is in a conduction state, the second rectifier circuit CR2 is conductively connected, and the output voltage Vo2 is supplied and smoothed by the capacitor Co2. Since the rectifier switch element Qs is in the conduction state, the pulse current flowing in the rectifier switch element Qs during the off-period of the first switching element Q1 is not restricted. When the output voltage Vo2 is greater than the reference voltage, the rectifier switch element Qs is in a non-conduction state, the second rectifier circuit CR2 is non-conductively connected, and a pulse current does not flow in the rectifier switch element Qs during the off-period of the first switching element Q1. In this manner, the conductive connection/non-conductive connection of the rectifier switch element Qs are controlled based on the voltage information of the second output voltage Vo2.

In addition, when a current flowing in the diode Ds2 becomes a backward current, the rectifier switch element Qs becomes non-conductively connected after the current has been cut off by the diode Ds2 having become inversely biased.

Furthermore, since the rectifier switch element Qs operates in response to a voltage occurring in the transformer T, the rectifier switch element Qs operates in synchronization with the switching frequencies of the first switching element Q1 and the second switching element Q2.

FIG. 2B is a diagram illustrating the specific circuit configuration of the second rectifier circuit CR2 illustrated in FIG. 2A. A circuit other than the second feedback circuit FB2, the diode Ds2, and the rectifier switch element Qs within this second rectifier circuit CR2 is the second switching control circuit CNT2 in FIG. 2A.

In FIG. 2B, in the output portion of the second feedback circuit FB2 within the second rectifier circuit CR2, a light-emitting element is provided that is paired with the light-receiving element PC (phototransistor) of a photo coupler. A boot capacitor Cb is provided within the second rectifier circuit CR2. Within the second rectifier circuit CR2, a time constant circuit is defined by the light-receiving element PC, a resistor Rt, and a capacitor Ct. A variable impedance circuit is defined by the light-receiving element PC (phototransistor) and the resistor Rt. In addition, a turn-on delay circuit is defined by the capacitor Cg and the resistors Rg, Rg2, and Rgs.

During a time period when an alternating-current winding voltage occurring in the second secondary winding Ns2 becomes a negative voltage, the boot capacitor Cb is charged with electric charge supplied from the second output voltage Vo2, and during a time period when the alternating-current winding voltage becomes a positive voltage, electric charge in the boot capacitor Cb is discharged.

The voltage of the above-described capacitor Ct is applied to a small-signal transistor (a switch mechanism) Tr, and the gate potential of the rectifier switch element Qs is controlled by this transistor Tr.

In addition, a capacitor Ce is connected in parallel to a series circuit including the diode Dbe and the light-receiving element PC (phototransistor). This capacitor Ce functions as a direct-current voltage source to supply a holding current used to hold the on-state of the small-signal transistor Tr.

The above-described diode Dbe prevents the capacitor Ct from being subjected to an inverse-voltage charge. A zener diode Dz restricts the gate potential of the rectifier switch element Qs, and prevents the rectifier switch element Qs from being damaged.

The operation of the switching power-supply circuit 101 illustrated in FIG. 2B is as follows.
(1) On-Period of First Switching Element Q1

The second rectifier circuit CR2 is set in a non-conduction state. The second output voltage Vo2 charges the boot capacitor Cb through the zener diode Dz, the resistor Rg, the resistor Rg2, and the Cg.
(2) On-Period of Second Switching Element Q2 (when Second Output Voltage Vo2 is Lower than Predetermined Voltage and Second Rectifier Circuit CR2 is Conductively Connected)

At this time period, there are the following three cases in accordance with the value of the variable impedance circuit in the time constant circuit.
(2-1) In a case in which the rectifier switch element Qs is turned off during the on-period of the second switching element Q2 (at the time of a light load), when the first switching element Q1 has been turned off, the voltage of the second secondary winding Ns2 is inverted and the second switching element Q2 is turned on.

The voltage (divided voltage) of the boot capacitor Cb is applied between the gate and source of the rectifier switch element Qs through the resistor Rg2, the Cg, and the resistor Rg, and the rectifier switch element Qs is turned on.

At this time, due to the electric charge of the boot capacitor Cb, the capacitor Ct is charged through the light-receiving element PC and the resistor Rt.

When both ends of the capacitor Ct have reached the threshold voltage (i.e., about 0.6 V, for example) of the transistor Tr, the transistor Tr is turned on. When the transistor Tr has been turned on, the rectifier switch element Qs is turned off.

When the voltage of the second secondary winding Ns2 has been inverted and a reverse voltage has been applied to the diode Ds2, the second rectifier circuit CR2 becomes non-conductively connected, and the first switching element Q1 is turned on.
(2-2) In a case in which the rectifier switch element Qs maintains an on-state during the on-period of the second switching element Q2, when the first switching element Q1 has been turned off, the voltage of the second secondary winding Ns2 is inverted, and the second switching element Q2 is turned on.

The voltage (divided voltage) of the boot capacitor Cb is applied between the gate and source of the rectifier switch element Qs through the resistor Rg2, the capacitor Cg, and the resistor Rg, and the rectifier switch element Qs is turned on. During a time period in which the rectifier switch element Qs is conductively connected, a pulse current flows in the rectifier switch element Qs without being restricted.

At this time, due to the electric charge of the boot capacitor Cb, the capacitor Ct is charged through the light-receiving element PC and the resistor Rt.

When a reverse voltage is applied to the diode Ds2 until both ends of the capacitor Ct reach the threshold voltage (i.e., about 0.6 V, for example) of the transistor Tr, the second rectifier circuit CR2 becomes non-conductively connected.

When the voltage of the second secondary winding Ns2 has been inverted and a reverse voltage has been applied to the diode Ds2, the second rectifier circuit CR2 becomes non-conductively connected, and the first switching element Q1 is turned on.
(2-3) In a case in which the rectifier switch element Qs maintains an off-state during the on-period of the second switching element Q2, when the first switching element Q1 has been turned off, the voltage of the second secondary winding Ns2 is inverted, and the second switching element Q2 is turned on.

In a case in which the transistor Tr is in an on-state where the voltage of the boot capacitor Cb applies a voltage between the gate and source of the rectifier switch element Qs through the resistor Rg2, the capacitor Cg, and the resistor Rg, the rectifier switch element Qs maintains an off-state. Since the rectifier switch element Qs is non-conductively connected, no pulse current flows in the rectifier switch element Qs.

When the voltage of the second secondary winding Ns2 has been inverted and a reverse voltage has been applied to the diode Ds2, the second rectifier circuit CR2 becomes non-conductively connected, and the first switching element Q1 is turned on.

The above-described operations (1) and (2) {one of (2-1), (2-2), and (2-3)} are repeated.

When the current of a load to which the second output voltage Vo2 is applied is a normal load current, a state (the above-described (2-2)) in which the rectifier switch element Qs is turned on and a state (missing-tooth state) (the above-described (2-3)) in which the rectifier switch element Qs is not turned on occur at the rises of the voltage of the second secondary winding Ns2 as illustrated in FIG. 3, and the second output voltage Vo2 is stabilized by controlling the number of pulses in the pulse current based on the occurrence frequency of the missing-tooth state.

When the current of a load to which the second output voltage Vo2 is applied is small (a light load), a charging time constant with respect to the capacitor Ct becomes small, and after the rectifier switch element Qs has been turned on, the voltage of the capacitor Ct swiftly reaches about 0.6 V, for example, the transistor Tr is turned on, and the rectifier switch element Qs is turned off (the state of the above-described (2-1)). In other words, in the light load, the on-time of the switch element Qs is shortened. Therefore, as illustrated in FIG. 3, during a time period in which the voltage of the secondary winding Ns2 occurs, the switch element Qs is turned off.

In this manner, in a normal load, a waveform at the time of the normal load in FIG. 3 is obtained, and in the light load, a waveform at the time of the light load in FIG. 3 or a waveform in which the waveform at the time of the normal load and the waveform at the time of the light load in FIG. 3 are mixed is obtained.

In addition, a case occurs in which when the switch element Qs has been turned off within a time period during which the voltage of the secondary winding Ns2 has occurred, a ZCS (zero-current switch) operation does not function. However, since a load is the light load and a current value cut off by the rectifier switch element Qs is small, a switching loss and noise at the time of turn-off do not cause any problems.

According to the first preferred embodiment, the following effects are achieved.

(a) Since the second switching control circuit CNT2 drives and controls the rectifier switch element Qs using the alternating-current winding voltage occurring in the secondary winding Ns2 such that the secondary winding Ns2 supplies the second output voltage, a direct-current power-supply voltage used to cause the second switching control circuit CNT2 to operate is not required.

(b) Since the second switching control circuit CNT2 drives and controls the rectifier switch element Qs using the alternating-current winding voltage occurring in the secondary winding Ns2 such that the secondary winding Ns2 supplies the second output voltage, it is not necessary to provide a drive winding used to cause the second switching control circuit CNT2 to operate.

(c) Since the second switching control circuit CNT2 drives and controls the rectifier switch element Qs using the alternating-current winding voltage occurring in the secondary winding Ns2 such that the secondary winding Ns2 supplies the second output voltage, a synchronizing circuit that operates in synchronization with the switching frequencies of the first switching element Q1 and the second switching element Q2 is not required.

(d) Due to the function of the turn-on delay circuit, it is possible to subject the turn-on of the rectifier switch element Qs to the zero-voltage switching (ZVS), and it is possible to reduce a switching loss.

(e) A PWM control logic circuit that outputs a pulse train signal having a duty ratio is not required.

(f) Due to the control of the rectifier switch element Qs, the number of pulses per unit time in a pulse current flowing through the rectifier switch element Qs is controlled, the second output voltage Vo2 becomes a highly accurate voltage, and it is possible to control a plurality of output voltages with a high degree of accuracy.

(g) At the time of a light load, a pulse width is controlled by controlling the on-time of the rectifier switch element Qs, and at the time of a heavy load, the rectifier switch element Qs is controlled so as to be set in one of an on-state and an off-state, by switching an operation mode. Accordingly, it is possible to significantly reduce or prevent the voltage rise of the second output voltage Vo2 at the time of the light load and significantly reduce or prevent the voltage reduction of the second output voltage Vo2 at the time of the heavy load, and it is possible to improve the voltage accuracy of the output voltage Vo2. In addition, since, in an operation in the heavy load, the turn-off of the rectifier switch element Qs is subjected to the ZCS (zero-current switching) operation, a substantial switching loss does not occur.

(h) Since the rectifier switch element Qs operates in synchronization with the switching frequencies of the first switching element Q1 and the second switching element Q2, there is no interference due to the mixing of a plurality of switching frequencies, and it is possible to significantly reduce or prevent the occurrence of sounding or a noise.

(i) It is possible to accumulate, in the capacitor Ce, electric charge used to control the transistor Tr, and responsiveness to a change in the impedance of the light-receiving element PC is improved. Accordingly, it is possible to improve the control responsiveness of the rectifier switch element Qs, and a control range in a direction to shorten the on-time of the rectifier switch element Qs is increased. As a result, it is possible to deal with a light load in a wider range. In other words, it is possible to significantly reduce or prevent a voltage rise at the time of the light load and an increase in a ripple voltage.

Second Preferred Embodiment

Figure 4:
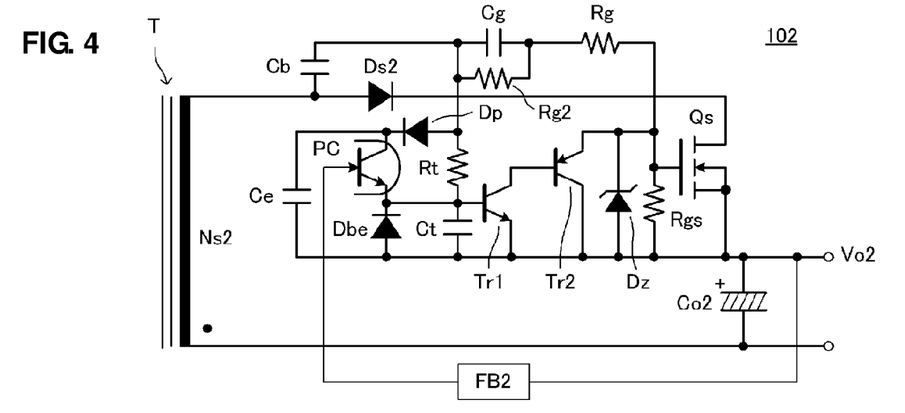
FIG. 4 is a circuit diagram of a main portion of a switching power-supply circuit according to a second preferred embodiment of the present invention.

FIG. 4 is the circuit diagram of the main portion of a switching power-supply circuit 102 according to a second preferred embodiment of the present invention. In FIG. 4, only a circuit connected to the second secondary winding Ns2 of a transformer T is illustrated. A circuit connected to the primary winding and the first secondary winding of the transformer T is preferably the same or substantially the same as the circuit illustrated in FIG. 2B in the first preferred embodiment.

In the second preferred embodiment, a PNP transistor Tr2 is connected between the gate and source of a rectifier switch element Qs, and an NPN transistor Tr1 used for a small signal is connected to this transistor Tr2.

According to the second preferred embodiment, an ability to drive the rectifier switch element Qs is high, and as a result of a high amplification factor provided by two-stage transistors, it is possible to reliably turn off the rectifier switch element Qs. The other functions are the same or substantially the same as the first preferred embodiment.

Third Preferred Embodiment

Figure 5:
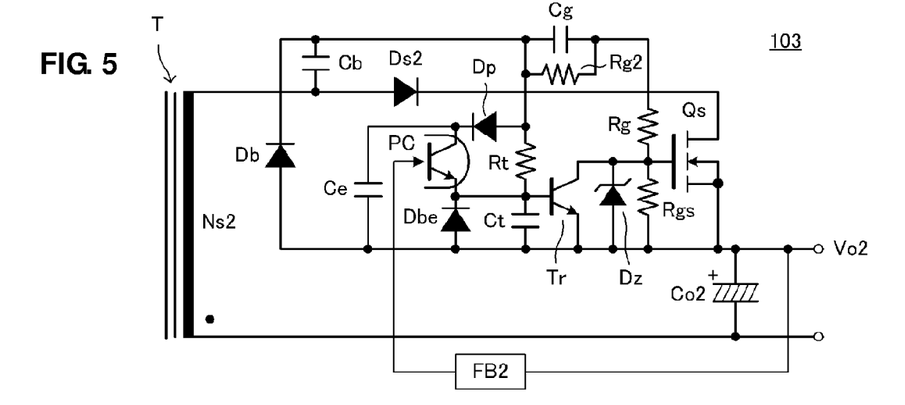
FIG. 5 is a circuit diagram of a main portion of a switching power-supply circuit according to a third preferred embodiment of the present invention.

FIG. 5 is the circuit diagram of the main portion of a switching power-supply circuit 103 according to a third preferred embodiment of the present invention. In FIG. 5, only a circuit connected to the second secondary winding Ns2 of a transformer T is illustrated. A circuit connected to the primary winding and the first secondary winding of the transformer T is preferably the same or substantially the same as the circuit illustrated in FIG. 2B in the first preferred embodiment.

In the third preferred embodiment, a boot diode Db that directly charges a boot capacitor Cb is provided.

According to the third preferred embodiment, charging impedance (charging time constant) to the boot capacitor Cb is small, and it is possible to charge the boot capacitor Cb in a short charging time. The other functions are the same or substantially the same as the first preferred embodiment.

Fourth Preferred Embodiment

Figure 6:
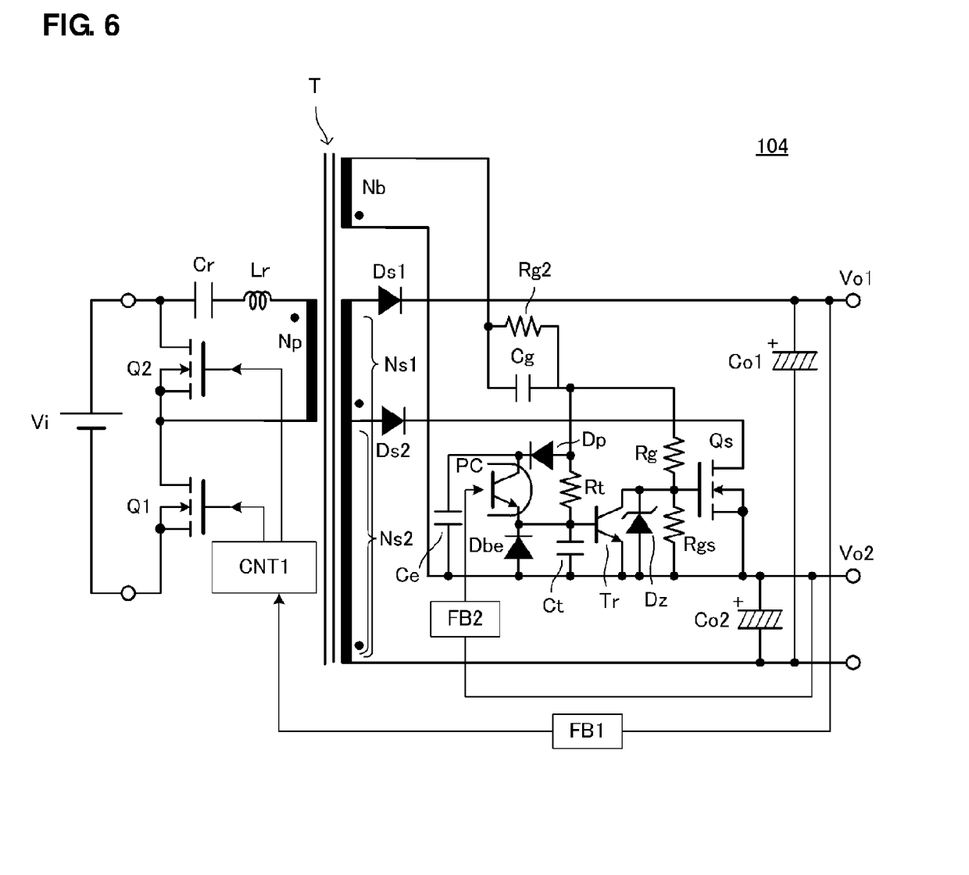
FIG. 6 is a circuit diagram of a switching power-supply circuit according to a fourth preferred embodiment of the present invention.

FIG. 6 is the circuit diagram of a switching power-supply circuit 104 according to a fourth preferred embodiment of the present invention. While, in the first to third preferred embodiments, an example is illustrated in which the rectifier switch element Qs is subjected to on/off control based on the alternating-current winding voltage occurring in the secondary winding Ns2 such that the secondary winding Ns2 supplies the second output voltage, in the fourth preferred embodiment, the rectifier switch element Qs is driven and controlled using a voltage occurring in a drive winding Nb provided in a transformer T.

In FIG. 6, when a first switching element Q1 has been turned off, the voltage of the drive winding Nb passes through a capacitor Cg and resistors Rg2, Rg, and Rgs, a voltage is applied between the gate and source of the rectifier switch element Qs, and the rectifier switch element Qs is turned on.

The voltage (divided voltage) of the drive winding Nb is applied to a capacitor Ct through the capacitor Cg, the resistors Rg2 and Rt, a diode Dp, and a light-receiving element PC. When the voltage of the capacitor Ct has exceeded a threshold voltage, i.e., about 0.6 V, for example, between the base and emitter of a transistor Tr, the transistor Tr is turned on.

The other functions are the same or substantially the same as the second preferred embodiment.

According to the fourth preferred embodiment, since it is possible to directly turn on the rectifier switch element Qs using the voltage of the drive winding Nb, the boot capacitor Cb illustrated in FIG. 2B is not required. In addition, since, based on the number of turns of the drive winding Nb provided in the transformer T, it is possible to set a voltage that is suitable to drive and control the rectifier switch element Qs, it is possible to drive the rectifier switch element Qs with optimum timing, and thus, to further reduce loss.

As for the rest, the same or substantially the same advantages as the advantages described in the first and second preferred embodiments are achieved.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A switching power-supply circuit comprising:
   a transformer including a primary winding, a first secondary winding, and a second secondary winding;
   a main switching element connected in series to the primary winding;
   a first voltage output;
   a second voltage output;
   a first rectifying/smoothing circuit that generates a first output voltage to the first voltage output by rectifying and smoothing an output of the first secondary winding;
   a second rectifying/smoothing circuit that generates a second output voltage to the second voltage output by rectifying and smoothing an output of the second secondary winding;
   a first feedback circuit that generates a feedback signal based on the first output voltage; and
   a first switching control circuit that controls the main switching element based on the feedback signal and stabilize the first output voltage; wherein
   the second rectifying/smoothing circuit includes a rectifier circuit;
   the rectifier circuit includes:
      a rectifier diode connected in series to the second voltage output;
      a rectifier switch element connected in series to the second voltage output;
      a switch element connected to a control terminal of the rectifier switch element;
      a capacitor connected between the transformer and the control terminal of the rectifier switch element;
      a second switching control circuit that controls an ON/OFF state of the rectifier switch element in response to an alternating-current winding voltage occurring in the transformer;
      a diode connected to the capacitor and that rectifies the alternating-current winding voltage occurring in the transformer through the capacitor; and
      another capacitor connected between the diode and the second output voltage and that provides a second feedback circuit with a smoothed voltage;
   the second switching control circuit includes:
      a time constant circuit connected between the second voltage output and the rectifier diode; and
      the second feedback circuit which detects and feeds back the second output voltage to the time constant circuit; and
   the time constant circuit controls the second output voltage by controlling an ON/OFF state of the switch element.

2. The switching power-supply circuit according to claim 1, wherein the capacitor is connected in parallel to the rectifier diode.

3. The switching power-supply circuit according to claim 1, wherein the rectifier circuit stabilizes the second output voltage by controlling a number of pulses per unit time in a pulse current flowing through the rectifier circuit.

4. The switching power-supply circuit according to claim 1, wherein the time constant circuit includes a variable impedance element with an impedance that changes in response to an output of the second feedback circuit, and another capacitor that is charged through the variable impedance element and applies a control voltage to the switch element.

5. The switching power-supply circuit according to claim 1, wherein
   a winding that generates the alternating-current winding voltage is the second secondary winding; and
   the capacitor is a boot capacitor that is charged by a supply of electric charge from the second output voltage during a time period when the alternating-current winding voltage becomes a negative voltage and discharged during a time period when the alternating-current winding voltage becomes a positive voltage.

6. The switching power-supply circuit according to claim 5, wherein the second switching control circuit includes a boot diode that rectifies the second output voltage and supplies electric charge to the boot capacitor.

7. The switching power-supply circuit according to claim 6, further comprising a diode connected between the second output voltage and a control terminal of the rectifier switch element so as to define the boot diode.

8. The switching power-supply circuit according to claim 7, wherein the boot diode is a zener diode.

9. The switching power-supply circuit according to claim 5, wherein
- in a path leading from the boot capacitor to the control terminal of the rectifier switch element, the second switching control circuit includes a turn-on delay circuit that defines a discharging time constant for electric charge in the boot capacitor and to delay turn-on of the rectifier switch element; and
- the turn-on delay circuit is defined by a series circuit including another capacitor and a resistor.

10. The switching power-supply circuit according to claim 5, wherein the another capacitor supplies a current used to hold a conduction state of the switch element, and the diode rectifies and supplies electric charge from the boot capacitor to the another capacitor.

11. The switching power-supply circuit according to claim 1, wherein the transformer includes a drive winding that generates the alternating-current winding voltage.

12. The switching power-supply circuit according to claim 11, wherein the another capacitor supplies a current used to hold a conduction state of the switch element, and the diode rectifies and supplies electric charge from the drive winding to the another capacitor.

13. The switching power-supply circuit according to claim 1, wherein the switch element includes a transistor.

14. The switching power-supply circuit according to claim 13, further comprising a diode that prevents an excessive negative voltage from being applied to a control terminal of the transistor.

15. The switching power-supply circuit according to claim 13, wherein the switch element includes two-stage transistors.

16. The switching power-supply circuit according to claim 1, wherein the second switching control circuit performs control of turning off the rectifier switch element within a time period of a positive voltage of the alternating current winding voltage in a state in which a current of a load to which the second output voltage is applied is smaller than a predetermined value and turning on the rectifier switch element or maintaining an off-state during the time period of the positive voltage of the alternating-current winding voltage in a state where the current of the load exceeds the predetermined value.

* * * * *